(12) United States Patent
Bhan et al.

(10) Patent No.: US 11,461,369 B2
(45) Date of Patent: Oct. 4, 2022

(54) SENSOR-BASED DETECTION OF RELATED DEVICES

(71) Applicant: SAP SE, Walldorf (DE)

(72) Inventors: Ashish Bhan, Palo Alto, CA (US); Shailesh Jannu, Fremont, CA (US)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 16/214,399

(22) Filed: Dec. 10, 2018

(65) Prior Publication Data
US 2020/0183953 A1    Jun. 11, 2020

(51) Int. Cl.
*G06F 16/28* (2019.01)

(52) U.S. Cl.
CPC .................. *G06F 16/285* (2019.01)

(58) Field of Classification Search
CPC .................................................. G06F 16/285
See application file for complete search history.

(56) References Cited

U.S. PATENT DOCUMENTS

| | | | | |
|---|---|---|---|---|
| 6,891,500 B2* | 5/2005 | Hall | ............ | G01S 5/0205 342/465 |
| 8,751,427 B1* | 6/2014 | Mysen | ............ | G06Q 30/0261 706/46 |
| 9,007,208 B2* | 4/2015 | Jerzak | ............ | G05B 23/0221 340/540 |
| 9,374,671 B1* | 6/2016 | Zhyshko | ............ | G01S 19/42 |
| 2006/0049976 A1* | 3/2006 | McFarland | ............ | G01S 5/0289 700/258 |
| 2006/0103534 A1* | 5/2006 | Arms | ............ | G06K 19/0716 340/572.1 |
| 2008/0126858 A1* | 5/2008 | Barras | ............ | G06F 11/327 714/25 |
| 2009/0059842 A1* | 3/2009 | Maltseff | ............ | H04W 40/32 370/328 |
| 2010/0034160 A1* | 2/2010 | Prakash | ............ | H04W 68/02 370/329 |
| 2010/0066599 A1* | 3/2010 | Liu | ............ | G01S 19/05 342/357.31 |
| 2010/0153292 A1* | 6/2010 | Zheng | ............ | G06Q 30/0282 705/347 |
| 2012/0191512 A1* | 7/2012 | Wuoti | ............ | H04W 4/33 705/14.1 |
| 2012/0239761 A1* | 9/2012 | Linner | ............ | G06F 40/279 709/206 |

(Continued)

OTHER PUBLICATIONS

Carasso, "Exploring Splunk", 2012, Splunk.*

(Continued)

*Primary Examiner* — Debbie M Le
*Assistant Examiner* — Huen Wong
(74) *Attorney, Agent, or Firm* — Buckley, Maschoff & Talwalkar LLC

(57) ABSTRACT

A system includes reception of a set of time-series data from each of a plurality of sensors, each of the plurality of sensors associated with one of a plurality of hardware devices, determination of a plurality of clusters based on the sets of time-series data, assignment of each set of time-series data to one of the plurality of clusters, and determination of associations between the plurality of hardware devices based on the assignments of time-series data to clusters.

20 Claims, 5 Drawing Sheets

(56) References Cited

U.S. PATENT DOCUMENTS

| | | | | |
|---|---|---|---|---|
| 2013/0141283 | A1* | 6/2013 | Galov | G01S 5/14 342/464 |
| 2013/0337830 | A1* | 12/2013 | Haro | G06Q 50/01 455/456.1 |
| 2014/0368340 | A1* | 12/2014 | Jerzak | G05B 19/048 340/540 |
| 2015/0131529 | A1* | 5/2015 | Zhou | H04W 8/005 370/328 |
| 2015/0149879 | A1* | 5/2015 | Miller | G06F 16/2477 715/226 |
| 2015/0213631 | A1* | 7/2015 | Vander Broek | G06T 11/206 345/589 |
| 2015/0221014 | A1* | 8/2015 | Gabbai | G06F 16/9538 705/26.64 |
| 2015/0278840 | A1* | 10/2015 | Zhao | G06Q 30/0207 705/14.1 |
| 2015/0295778 | A1* | 10/2015 | Hsiao | H04L 41/22 715/736 |
| 2015/0348095 | A1* | 12/2015 | Dixon | G06Q 30/0246 705/14.45 |
| 2016/0034525 | A1* | 2/2016 | Neels | G06F 16/285 707/737 |
| 2016/0127931 | A1* | 5/2016 | Baxley | G06F 16/951 455/67.16 |
| 2016/0147830 | A1* | 5/2016 | Zhong | G06F 16/125 707/769 |
| 2016/0371363 | A1* | 12/2016 | Muro | G06F 16/285 |
| 2017/0220938 | A1* | 8/2017 | Sainani | G06F 16/2471 |
| 2017/0272906 | A1* | 9/2017 | Kerai | H04W 12/06 |
| 2018/0097762 | A1* | 4/2018 | Garcia | H04L 67/18 |
| 2019/0068714 | A1* | 2/2019 | Flammer, III | H04L 67/2828 |
| 2019/0364009 | A1* | 11/2019 | Joseph | G06F 7/14 |
| 2020/0265061 | A1* | 8/2020 | Gratton | G06F 16/254 |

OTHER PUBLICATIONS

Steiger et al., "Visual Analysis of Time-Series Similarities for AnomalyDetection in Sensor Networks" 2014, Eurographics Conference on Visualization (EuroVis).*

Lhermitte et al., "A comparison of time series similarity measures for classification and change detection of ecosystem dynamics" Aug. 27, 2011, Elsevier Inc.*

"Relation Inference among Sensor Time Series in Smart Buildings with Metric Learning", Association for the Advancement of Artificial Intelligence (AAAI) (Year: 2020).*

Zhao et al., "IoT Service Clustering for Dynamic Service Matchmaking", Molecular Diversity Preservation International (MDPI) (Year: 2017).*

Madiraju, Naween Sair et al., "Deep Temporal Clustering: Fully Unsupervised Learning of Time-Domain Features", Computer Science, Feb. 4, 2018, arXiv:1802.01059v1 [cS.LG], 11pgs.

* cited by examiner

SENSOR-BASED DETECTION OF RELATED DEVICES

BACKGROUND

In many industrial settings, different industrial devices are instrumented with sensors which measure properties related to the operation thereof. Measured properties may include, for example, temperature, pressure, windspeed, vibration, velocity, displacement, and pH. The measurements may be continuous or real-valued (e.g., temperatures such as 98.2, 97.1, . . . ), integer-valued, discrete, categorical (e.g., high, medium, low), and may exhibit a well-defined order (e.g., ordinal numbers) or no such order (e.g., error codes ZPA2, CMN3). Monitoring these measured properties may provide insight into the operational state of the devices.

Traditionally, a user manually assigns a device to a group of related devices based on a limited subset of attributes, which is prone to error. Further, the relation of a device to a group of devices may change dynamically based on real-time behavior. It may be beneficial to identify related devices based on the data generated by their associated sensors. However, a modern system may include hundreds of devices outfitted with thousands to millions of sensors. Moreover, measurement data generated by these sensors vary in frequency and noise level, further complicating device identification based thereon.

Systems are desired to efficiently determine related devices based on time-series data generated by sensors associated with the devices.

DETAILED DESCRIPTION

Features and advantages of the example embodiments, and the manner in which the same are accomplished, will become more readily apparent with reference to the following detailed description taken in conjunction with the accompanying drawings.

The following description sets forth specific details to provide a thorough understanding of the various example embodiments. It should be appreciated that various modifications to the embodiments will be readily-apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the described embodiments, but is to be accorded the widest scope consistent with the principles and features disclosed herein.

Some embodiments provide a technical solution to the above-described technical problem by reducing the dimensionality of time-series data generated by sensors which are associated with respective devices. The reduced data may be more-easily and more-accurately clustered into similar groups than the original time-series data. Sensors associated with time-series data of a given cluster group may be identified and the devices associated with those sensors may be deemed related. Data reduction and clustering according to some embodiments may employ unsupervised learning techniques.

Figure 1:
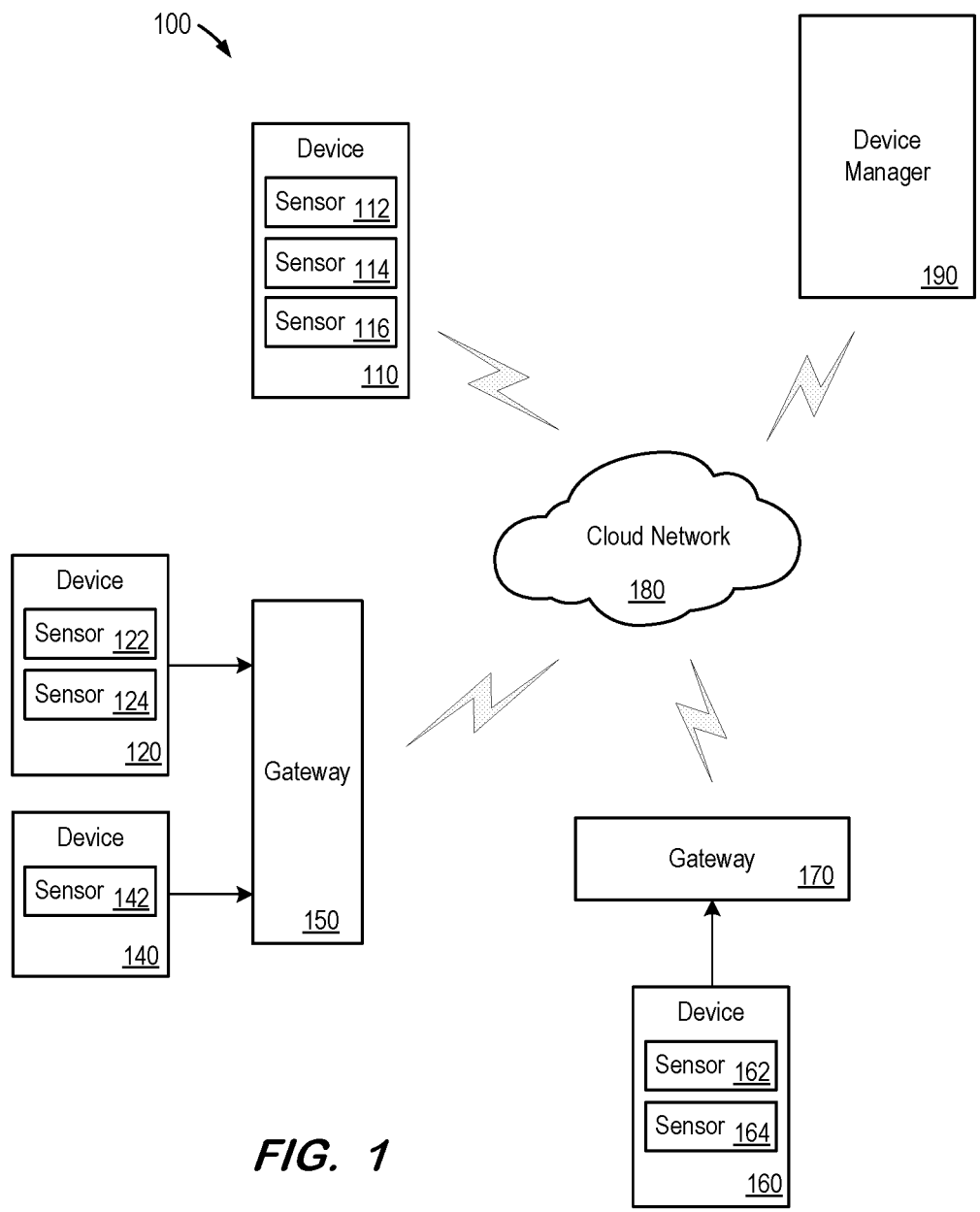
FIG. 1 is a block diagram of a system architecture according to some embodiments.

FIG. 1 is a block diagram of system architecture 100 according to some embodiments. Architecture 100 includes devices 110, 120, 140 and 160 which may comprise any hardware devices that are or become known. In one non-exhaustive example, devices 110, 120, 140 and 160 are a subset of devices used in a manufacturing plant. Examples of such devices include, but are not limited to, pumps, compressors, conveyor belts, robotic arms, sorters, mixing devices and nozzles. Devices 110, 120, 140 and 160 need not be in proximity to one another.

Each of devices 110, 120, 140 and 160 is associated with one or more sensors. Association of a sensor with a device indicates that the data generated by the sensor is related to the device. The data may reflect temperature of the device, temperature of ambient air surrounding the device, temperature of a specific component of the device, rotations per minute, pressure, etc. The present description relates to sensors which generate and output time-series data as is known in the art, but any of devices 110, 120, 140 and 160 may be associated with one or more sensors of a different type.

Specifically, device 110 is associated with sensors 112, 114 and 116 as is known in the art. Depiction of a sensor within a device as shown in FIG. 1 is only intended to illustrate an association between the sensor and the device, and is not intended to limit the association to any particular physical relationship. Each of sensors 112, 114 and 116 (and possibly device 110) is in communication with cloud network 180, which may comprise any one or more public and/or private networks.

FIG. 1 also includes device 120 associated with sensors 122 and 124, and device 140 associated with sensor 142. These sensors (and devices) are in communication with gateway 150, which may provide some "edge" processing of sensor data as is known in the art. Gateway 150 is also in communication with network 180 in order to provide time-series data generated by sensors 122, 124 and 142 to network 180.

Similarly, device 160 includes sensors 162 and 164, each of which communicates with network 180 via gateway 170. Gateway 170 may also provide edge processing of data generated by sensors 162 and 164.

According to the illustrated embodiment, device manager 190 receives the time-series data generated by the sensors of architecture 100. Device manager 190 may monitor and manage devices 110, 120, 140 and 160 based at least in part on the data received from the associated sensors. One aspect of such management may include determining groups of related devices in order to simplify the management thereof. As the devices of architecture 100 may be deployed dynamically and/or may number in the hundreds or thousands, device manager 190 may advantageously determine groups of related devices based on time-series data generated by the sensors of architecture 100 as described herein.

Device management server 190 may comprise a data storage platform such as a database or a data warehouse, and may comprise a distributed processing and/or storage architecture. Each of the components illustrated and described herein may be implemented by software and/or one or more hardware elements, with some software and/or hardware elements being shared among more than one illustrated component. One or more of the software and/or hardware elements may be located in a cloud deployment or on-premise. Embodiments are not limited to an architecture as shown in FIG. 1.

Figure 2A:
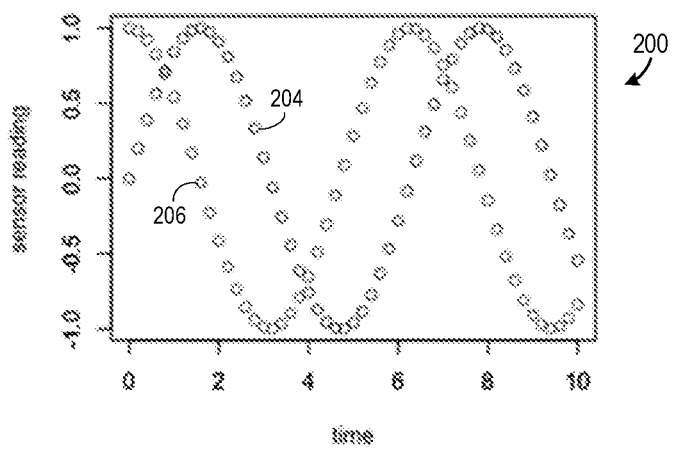
FIGS. 2A through 2C illustrate data received from sensors according to some embodiments.
Figure 2B:
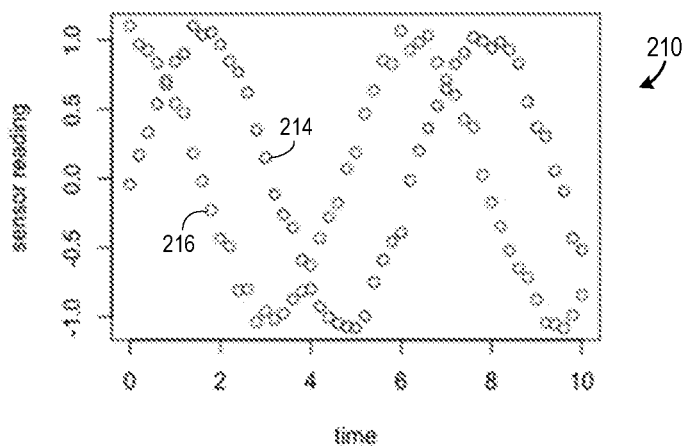
Figure 2C:
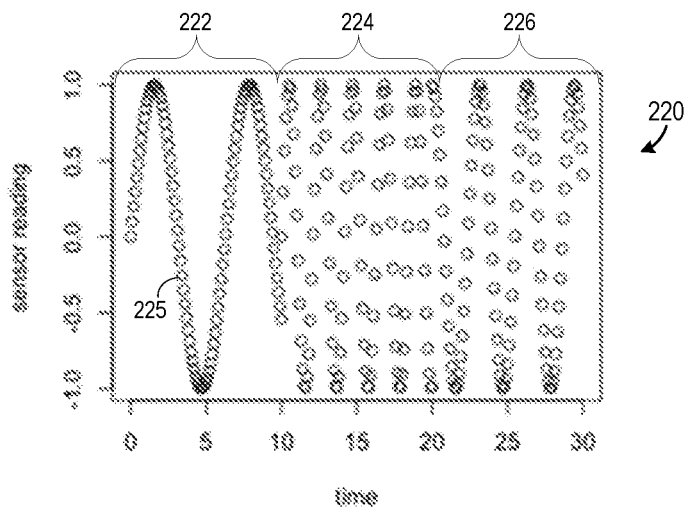

FIGS. 2A through 2C illustrate sets of time-series data which may be received from sensors according to some embodiments. The illustrations are intended to highlight some difficulties in determining similarity between sets of time-series data.

Graph 200 of FIG. 2A shows sets 204 and 206 of time-series data. As shown, sets 204 and 206 exhibit a same underlying frequency and are phase-shifted. Assuming sets 204 and 206 were generated by sensors associate with two different devices, embodiments are intended to identify the two different devices as related based on time-series data sets 204 and 206.

Graph 210 of FIG. 2B shows sets 214 and 216 of time-series data received from two different sensors. Time-series data sets 214 and 216 have different frequencies. In some embodiments, the relatedness of the devices associated with the two different sensors is related to a difference in the two frequencies. The smaller the difference in the frequencies, the higher the likelihood that the devices associated with the two different sensors will be deemed related.

FIG. 2C includes graph 220 of time-series data 225. Data 225 exhibits different frequencies over time windows 222, 224 and 226. According to some embodiments, the dimensionality of data 225 is reduced so as to allow comparison of data 225 with data of other and/or non-varying frequencies in order to determine if their associated devices are related.

The time series data of FIGS. 2A through 2C are also subject to noise. Embodiments may operate to efficiently identify related devices based on noisy time-series data received from associated sensors.

Figure 3:
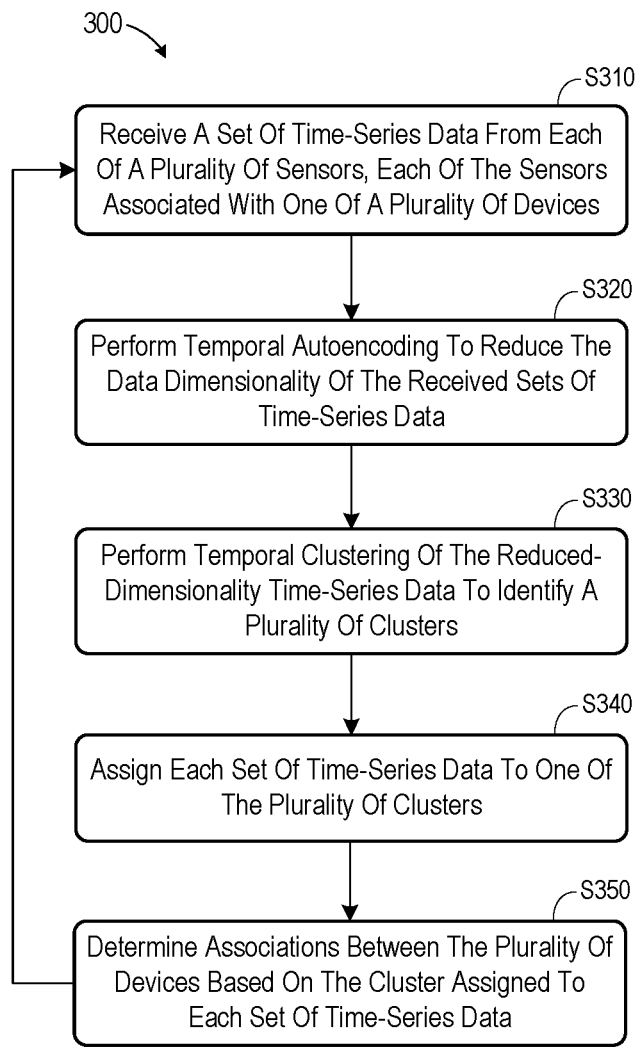
FIG. 3 is a flow diagram of a process to determine associations between a plurality of devices based on sensor data according to some embodiments.

FIG. 3 is a flow diagram of process 300 according to some embodiments. Process 300 and the other processes described herein may be performed using any suitable combination of hardware and software. Software embodying these processes may be stored by any non-transitory tangible medium, including but not limited to a fixed disk, non-volatile random access memory, volatile random access memory, a DVD, a Flash drive, or a magnetic tape.

Initially, at S310, a set of time-series data is received from each of a plurality of sensors. Each set of time-series data includes at least one data value associated with a time stamp. Each received set of time-series data may therefore be considered temporal data.

Each of the sensors from which the sets of data are received is associated with a device. For example, time-series data may be received at S310 from sensors 112, 114, 116, 122, 124, 142, 162 and 164 of architecture 100, each of which is associated with a device as depicted in FIG. 1.

The sets of time-series data may be received in real-time by a device manager such as device manager 190. According to some embodiments, the sets of data are stored on one or more storage nodes (e.g., gateways 150 and 170), and later retrieved at S310 for processing.

Next, at S320, temporal autoencoding is performed to reduce the data dimensionality of the sets of time-series data. The sets of time-series data are transformed into a low-dimensional latent space. This latent representation may be compatible with a temporal similarity metric to facilitate subsequent temporal clustering of the latent representations.

Figure 4:
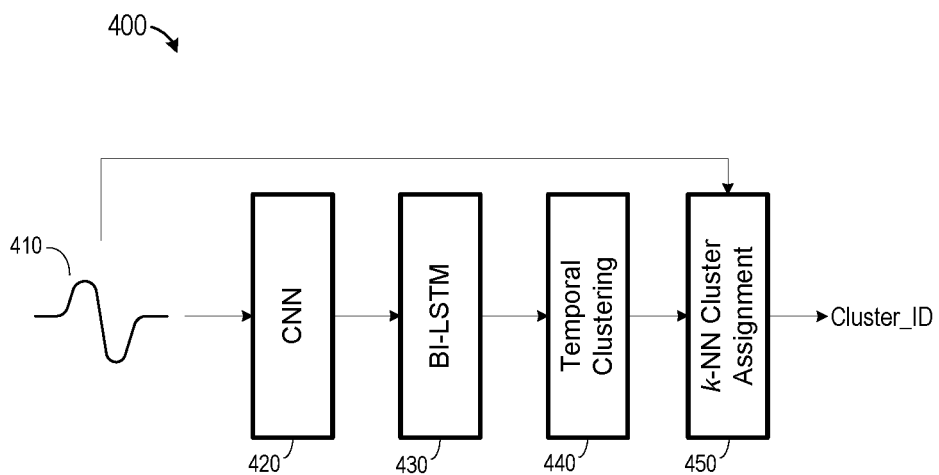
FIG. 4 is a block diagram of an unsupervised learning system to assign input time-series data to a cluster according to some embodiments.

FIG. 4 is a block diagram of architecture 400 to perform process 300 according to some embodiments. Time-series data 410 is received by Convolutional Neural Network (CNN) 420 to reduce the data dimensionality and learn the dominant short-time-scale waveforms. The results are passed to Bi-directional Long Short Term Memory (Bi-LSTM) network 430, which further reduces the data dimensionality and learns the temporal connections between waveforms across all time scales. CNN 420 and BI-LSTM network 430 thereby constitute a temporal autoencoder.

A plurality of clusters is identified at S330 by performing temporal clustering of the reduced-dimensionality time-series data. With respect to architecture 400, temporal clustering component 440 performs non-parametric clustering of latent representations output from Bi-LSTM network 430. Such clustering may include identifying one or more spatio-temporal dimensions along which the data split into two or more classes.

Each of the sets of time-series data is assigned to one of the clusters at S340. As shown in FIG. 4, component 450 may use a k-nearest neighbors algorithm to assign data 410 to one of the determined clusters. Such an assignment may result in association of signal 410 with a Cluster_ID. Next, at S350, associations between devices are determined based on the clusters assigned to the sets of time-series data. In one example, all devices associated with sensors which have been assigned a same Cluster_ID are deemed to be associated with one another. Such associations may be useful in managing associated devices as a group rather than individually.

Flow may then return from S350 to S310 to receive another plurality of sets of time-series data. Iterative execution of process 300 in this manner may facilitate refinement of the algorithms used at S320 and S320 via unsupervised learning.

According to some embodiments, system 400 is "seeded" with representative data $x_i$ in order to learn a workable initial algorithm. The representative data is passed through CNN 420 and BI-LSTM 430 to obtain a reduced, encoded representation $z_i$. These representations are then clustered by component 440 using a standard approach like k-nearest neighbors to find cluster centers $w_j$.

The representative data is chosen so that the resulting clusters span a diverse and relevant section of sample space in which the sensor data of the monitored system is likely to reside. If the sensor data enters a new regime different from the representative data, system 400 may determine a new cluster by assigning a new data point to the cluster center. As new data is received by system 400 in this regime, more data points are assigned to this cluster and the cluster center is updated to be the average of the reduced representations $z_i$ assigned to this cluster.

Figure 5:
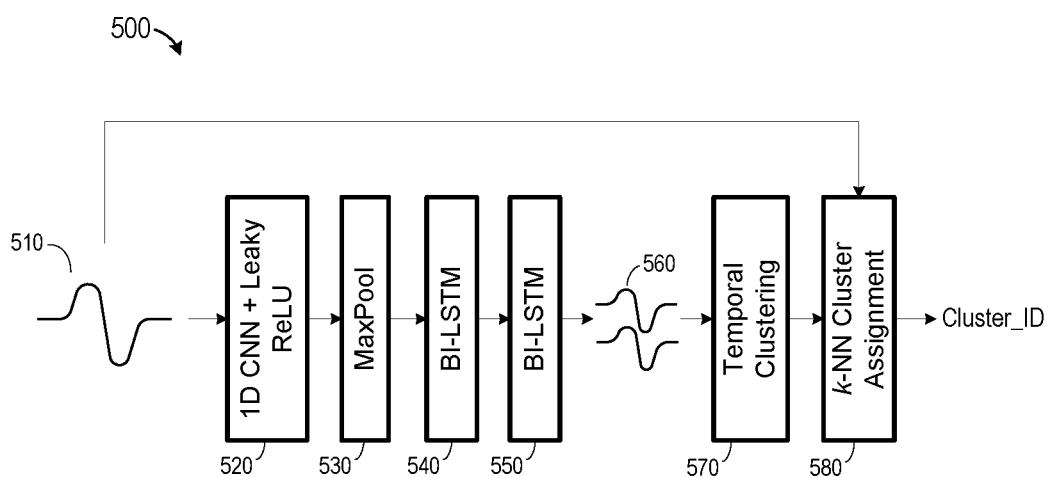
FIG. 5 is a detailed block diagram of an unsupervised learning system to assign input time-series data to a cluster according to some embodiments.

FIG. 5 illustrates architecture 500 to execute process 300 according to some embodiments. A latent representation is generated at S320 using a two-level temporal autoencoder. The first level consists of 1D convolution layer 520 using leaky rectifying linear units to extract key short-term features (waveforms), followed by max pooling layer 530 of size P. The first level casts time-series data into a more compact representation while retaining most of the relevant information. This dimensionality reduction allows further processing to avoid very long sequences, which can lead to poor performance.

First-level activations are then fed to the second level Bi-LSTM networks 540 and 550 to obtain latent representation 560. BI-LSTM networks are used to learn temporal changes in both time directions. The input sequences are therefore allowed to collapse in all dimensions except temporal, and to cast the input into a smaller latent space than otherwise. Temporal clustering then assigns latent representations 560 of sequences z, i=1 . . . n, to clusters.

Unsupervised learning in CNN 520 and Bi-LSTM networks 540 and 550 is driven by interleaved minimization of two cost functions. A first cost function may be provided by the mean square error of the input sequence reconstruction from BI-LSTM latent representation 560. This cost function ensures that the sequence is still adequately represented after the dimensionality reduction in the first and second levels. Reconstruction is provided by an upsampling layer of size P followed by a deconvolutional layer to obtain autoencoder output.

The second cost function is provided by a clustering metric of the third level, and is intended to ensure that the high-level features that define the subspace spanned by the cluster centroids separate the sequences $x_i$, i=1 . . . n into k clusters of distinct spatio-temporal behavior. The clustering metric optimization modifies the weights in BI-LSTM networks 540 and 550 and in CNN 550. As the result, the high-level features encoded by the BI-LSTM networks 540 and 550 may optimally separate the sequences into clusters, thus disentangling the spatio-temporal manifolds of the sets of time-series data.

The temporal clustering layer consists of k centroids $w_j$, $j \in 1 \ldots k$. To initialize these cluster centroids, the latent signals $z_i$ obtained by feeding input $x_i$ through the initialized temporal autoencoder are used. Signals $z_i$ are then used to perform hierarchical clustering with complete linkage in the feature space Z through a similarity metric. The similarity metric may comprise, for example, Complex Invariant Similarity, Correlation-Based Similarity, Auto-Correlation Based Similarity, and Euclidean similarity, as are known in the art. k cut is performed to obtain the clusters and then the elements in each cluster are averaged to obtain initial centroids estimates $w_j$, j=1 . . . k.

After obtaining an initial estimate of the centroids $w_j$, the temporal clustering layer is trained using an unsupervised algorithm that alternates between two steps. First, the probability of input $x_i$ belonging to the cluster j is computed. The closer the latent representation $z_i$ of input $x_i$ is to the centroid $w_j$, the higher is the probability of $x_i$ belonging to cluster j. Second, the centroids are updated using a loss function, which maximizes the high confidence assignments using a target distribution p.

Figure 6:
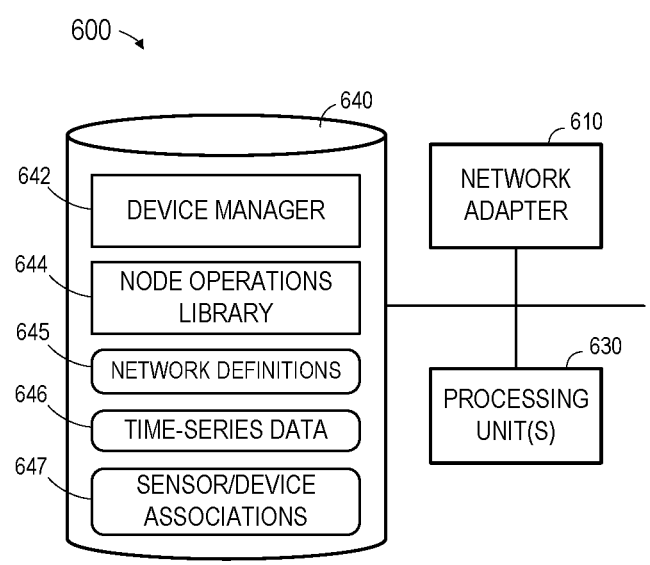
FIG. 6 is a block diagram of an apparatus according to some embodiments.

FIG. 6 illustrates computing system 600 according to some embodiments. System 600 may comprise a computing system to execute processes described herein. Computing system 600 may comprise a standalone system, or one or more elements of computing system 600 may be located in the cloud.

System 600 includes network adapter 610 to receive data from external devices such as remote sensors via a network connection. Processing unit(s) 630 may comprise one or more processors, processor cores, or other processing units to execute processor-executable process steps. In this regard, storage system 640, which may comprise one or more memory devices (e.g., a hard disk drive, a solid-state drive), stores processor-executable process steps of device manager 642 which may be executed by processing unit(s) 630 to determine similar devices as described herein. Process steps of device manager 642 may be executed to perform any other suitable functions.

Device manager 642 may utilize node operations library 644, which includes code to execute various operations associated with node operations of one or more neural networks as defined in network definitions 645. According to some embodiments, computing system 600 provides interfaces and development software (not shown) to enable development of device manager 642 and generation of network definitions 645. Storage device 640 also includes received sets of time-series data 646 and data 647 associating related sensors and devices.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a plurality of hardware devices;
a plurality of sensors, each of the plurality of sensors being associated with one of the plurality of hardware devices and measures at least one property of the particular associated device to generate time series data, values of the time-series data each being associated with a time stamp; and
a computing system to:
receive, from each of the plurality of sensors, a set of time-series data generated by each of the plurality of sensors;
reduce a dimensionality of the sets of time-series data by a two-level temporal autoencoder to generate a latent representation of each of the sets of time-series data, the two-level temporal autoencoder including at least two neural networks;
determine, based on a temporal similarity metric, a plurality of clusters of the plurality of latent representations of each of the sets of time-series data generated and received from the plurality of sensors, the temporal similarity metric being based on a shift in phase for at least two of the sets of the time-series data having a same frequency, wherein a relatedness of devices associated with the different plurality of sensors is based on a phase shift difference in frequency for the at least two of the sets of the time-series data, wherein the smaller the difference in frequencies, the higher the likelihood that the devices associated with the different sensors will be deemed related;
assign each of the plurality of latent representations of each of the sets of time-series data generated by and received from each of the plurality of sensors to one of the determined plurality of clusters; and
determine associations between the plurality of hardware devices based on the assignments of each of the plurality of latent representations of each of the sets of time-series data generated by and received from each of the plurality of sensors to the determined plurality of clusters.

2. A system according to claim 1, wherein the temporal similarity metric is used to identify at least one spatio-temporal dimension along which to divide the sets of the time-series data into two or more clusters.

3. A system according to claim 1, wherein determination of the associations between the plurality of hardware devices comprises:
determining two or more sets of the time-series data assigned to a same cluster;
determining two or more of the plurality of sensors from which the two or more sets of the time-series data were received;
determining two or more of the plurality of hardware devices associated with the two or more of the plurality of sensors; and
determining an association between the two or more of the plurality of hardware devices.

4. A system according to claim 1, wherein the reducing of the dimensionality of each set of time-series data comprises:
inputting each set of time-series data to the two-level temporal autoencoder.

5. A system according to claim 1, wherein the determination of the associations between the plurality of hardware devices comprises:
determining two or more sets of the time-series data assigned to a same cluster;
determining two or more of the plurality of sensors from which the two or more sets of the time-series data were received;
determining two or more of the plurality of hardware devices associated with the two or more of the plurality of sensors; and
determining an association between the two or more of the plurality of hardware devices.

6. A system according to claim 1, the computing system to further:
receive, from each of the plurality of sensors, a second set of time-series data generated by each of the plurality of sensors;
reduce a dimensionality of each of the second sets of time-series data to generate a latent representation of each of the second sets of time-series data by inputting each of the second sets of time-series data to the two-level temporal autoencoder;
determine a second plurality of clusters based on the temporal similarity metric and the plurality of latent representations of the second set of time- series data;
assign each of the second sets of time-series data generated by and received from each of the plurality of sensors to one of the determined second plurality of clusters; and
determine second associations between the plurality of hardware devices based on the temporal similarity metric and the assignments of the second sets of time-series data generated by and received from each of the plurality of sensors to the second plurality of clusters.

7. A system according to claim 6, wherein the latent representation of each of the second sets of time-series data is generated by inputting each of the second sets of time-series data to the two-level temporal autoencoder; and
the second plurality of clusters is determined by performing temporal clustering.

8. A computer-implemented method comprising:
receiving a set of time-series data from each of a plurality of sensors, each of the plurality of sensors being associated with one of a plurality of hardware devices and measuring at least one property of the particular associated device to generate time series data, values of the time-series data each being associated with a time stamp;
reducing a dimensionality of the sets of time-series data by a two-level temporal autoencoder to generate a latent representation of each of the sets of time-series data, the two-level temporal autoencoder including at least two neural networks;
determining, based on a temporal similarity metric, a plurality of clusters of the plurality of latent representations of each of the sets of time-series data generated and received from the plurality of sensors, the temporal similarity metric being based on a shift in phase for at least two of the sets of the time-series data having a same frequency, wherein a relatedness of devices associated with the different plurality of sensors is based on a phase shift difference in frequency for the at least two of the sets of the time-series data, wherein the smaller the difference in frequencies, the higher the likelihood that the devices associated with the different sensors will be deemed related;
assigning each of the plurality of latent representations of each of the sets of time-series data generated by and received from each of the plurality of sensors to one of the determined plurality of clusters; and
determining associations between the plurality of hardware devices based on the assignments of each of the plurality of latent representations of each of the sets of time-series data generated by and received from each of the plurality of sensors to the determined plurality of clusters.

9. A method according to claim 8, wherein the temporal similarity metric is used to identify at least one spatiotemporal dimension along which to divide the sets of the time-series data into two or more clusters.

10. A method according to claim 8, wherein determining the associations between the plurality of hardware devices comprises:
determining two or more sets of the time-series data assigned to a same cluster;
determining two or more of the plurality of sensors from which the two or more sets of the time-series data were received;
determining two or more of the plurality of hardware devices associated with the two or more of the plurality of sensors; and
determining an association between the two or more of the plurality of hardware devices.

11. A method according to claim 8, wherein the reducing of the dimensionality of each set of time-series data comprises:
inputting each set of time-series data to the two-level temporal autoencoder.

12. A method according to claim 8, wherein determining the associations between the plurality of hardware devices comprises:
determining two or more sets of the time-series data assigned to a same cluster;
determining two or more of the plurality of sensors from which the two or more sets of the time-series data were received;
determining two or more of the plurality of hardware devices associated with the two or more of the plurality of sensors; and
determining an association between the two or more of the plurality of hardware devices.

13. A method according to claim 8, further comprising:
receiving, from each of the plurality of sensors, a second set of time-series data generated by each of the plurality of sensors;
reducing a dimensionality of each of the second sets of time-series data to generate a latent representation of each of the second sets of time-series data by inputting each of the second sets of time-series data to the two-level temporal autoencoder;
determining a second plurality of clusters based on the temporal similarity metric and the plurality of latent representations of the second sets of time-series data;
assigning each of the second sets of time-series data generated by and received from each of the plurality of sensors to one of the determined second plurality of clusters; and
determining second associations between the plurality of hardware devices based on the temporal similarity metric and the assignments of the second sets of time-series data generated by and received from each of the plurality of sensors to the second plurality of clusters.

14. A method according to claim 13, wherein the representation of each of the second sets of time-series data is generated by inputting each of the sets of time-series data to the two-level temporal autoencoder; and
the second plurality of clusters is determined by performing temporal clustering.

15. A computing system comprising:
a memory storing processor-executable process steps; and
a processing unit to execute the process steps to cause the computing system to:
receive a set of time-series data from each of a plurality of sensors, each of the plurality of sensors being associated with one of a plurality of hardware devices and measuring at least one property of the particular associated device to generate time series data, values of the time-series data each being associated with a time stamp;
reduce a dimensionality of the sets of time-series data by a two-level temporal autoencoder to generate a latent representation of each of the sets of time-series data, the two-level temporal autoencoder including at least two neural networks;
determine, based on a temporal similarity metric, a plurality of clusters of the plurality of latent representations of each of the sets of time-series data generated and received from the plurality of sensors, the temporal similarity metric being based on a shift in phase for at least two of the sets of the time-series data having a same frequency, wherein a relatedness of devices associated with the different plurality of sensors is based on a phase shift difference in frequency for the at least two of the sets of the time-series data, wherein the smaller the difference in frequencies, the higher the likelihood that the devices associated with the different sensors will be deemed related;
assign each of the plurality of latent representations of each of the sets of time-series data generated by and received from each of the plurality of sensors to one of the determined plurality of clusters; and determine associations between the plurality of hardware devices based on the assignments of each of the plurality of latent representations of each of the sets of time-series data generated by and received from each of the plurality of sensors to the determined plurality of clusters.

16. A computing system according to claim 15, wherein the temporal similarity metric is used to identify at least one spatio-temporal dimension along which to divide the sets of the time-series data into two or more clusters.

17. A computing system according to claim 15, wherein determination of the associations between the plurality of hardware devices comprises:
    determining two or more sets of the time-series data assigned to a same cluster;
    determining two or more of the plurality of sensors from which the two or more sets of the time-series data were received;
    determining two or more of the plurality of hardware devices associated with the two or more of the plurality of sensors; and
    determining an association between the two or more of the plurality of hardware devices.

18. A computing system according to claim 15, wherein the reducing of the dimensionality of each set of time-series data comprises:
    inputting each set of time-series data to the two-level temporal autoencoder temporal autoencoder.

19. A computing system according to claim 15, wherein the determination of the associations between the plurality of hardware devices comprises:
    determining two or more sets of the time-series data assigned to a same cluster;
    determining two or more of the plurality of sensors from which the two or more sets of the time-series data were received;
    determining two or more of the plurality of hardware devices associated with the two or more of the plurality of sensors; and
    determining an association between the two or more of the plurality of hardware devices.

20. A computing system according to claim 15, the processing unit to execute the process steps to cause the computing system to:
    receive, from each of the plurality of sensors, a second set of time-series data generated by each of the plurality of sensors;
    reduce a dimensionality of each of the second sets of time-series data to generate a latent representation of each of the second sets of time-series data by inputting each of the second sets of time-series data to the two-level temporal autoencoder;
    determine a second plurality of clusters based on the temporal similarity metric and the plurality of latent representations of the second sets of time-series data;
    assign each of the second sets of time-series data generated by and received from each of the plurality of sensors to one of the determined second plurality of clusters; and
    determine second associations between the plurality of hardware devices based on the temporal similarity metric and the assignments of the second sets of time-series data generated by and received from each of the plurality of sensors to the second plurality of clusters.

* * * * *